UNITED STATES PATENT OFFICE.

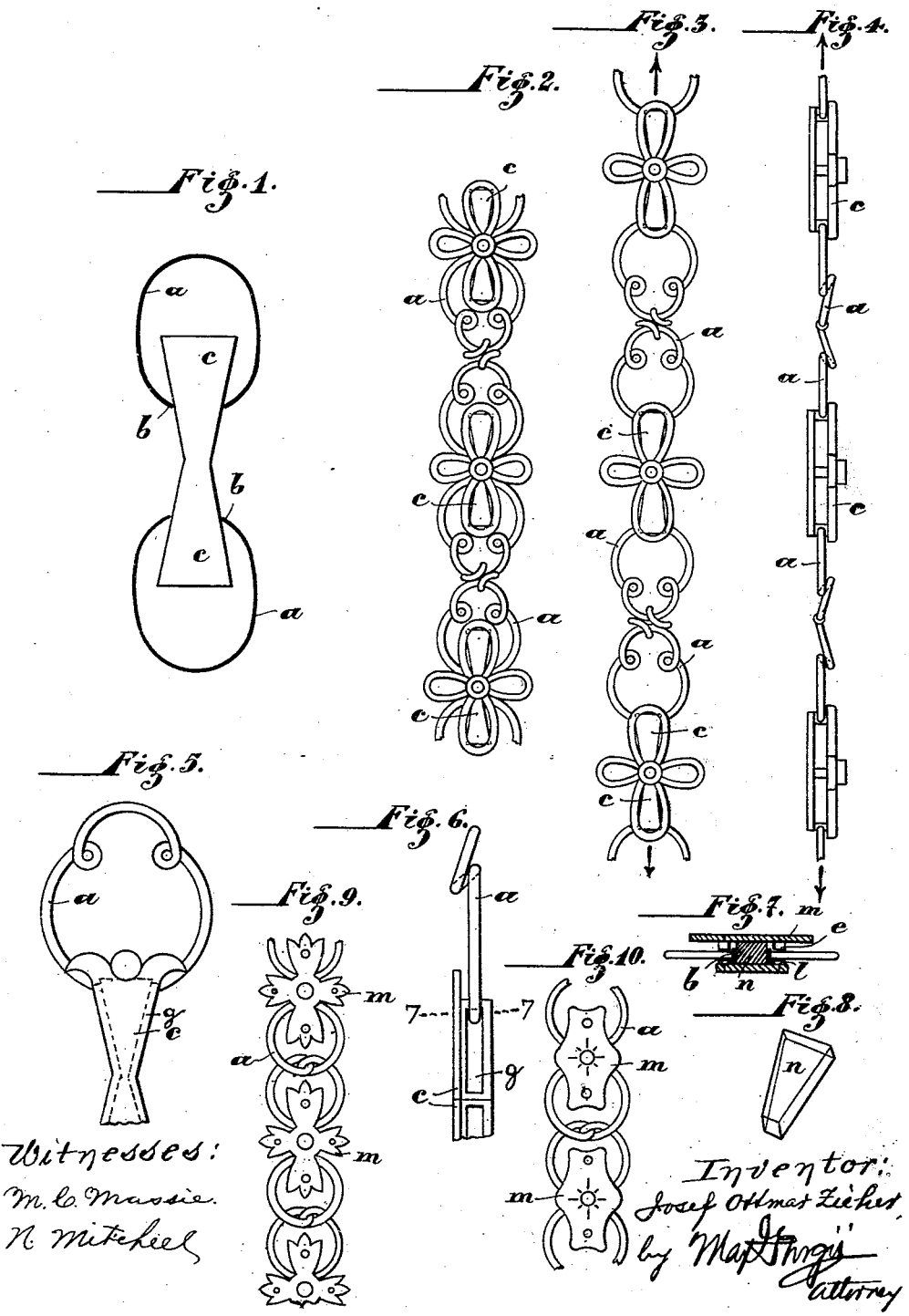

JOSEF OTTMAR ZIEHER, OF GMÜND, GERMANY.

BRACELET.

SPECIFICATION forming part of Letters Patent No. 684,161, dated October 8, 1901.

Application filed July 28, 1900. Serial No. 25,184. (No model.)

*To all whom it may concern:*

Be it known that I, JOSEF OTTMAR ZIEHER, manufacturing jeweler, residing at 7 Kapuzinergasse, Gmünd, in the Kingdom of Würtemberg, Germany, have invented certain new and useful Improvements in Bracelets, of which the following is a full, clear, and exact description.

My invention relates to extensible or spring bracelets provided with a peculiar coupling for the loops or links, this coupling being arranged in such a manner that the bracelet may be easily contracted or elongated, as may be required. For this purpose I use a coupling consisting of a framing adapted to receive diverging double wedges, to which the loops or links are alternately connected. By this arrangement it is possible to make use of a variety of various ornaments, this fact being of great importance in bracelets.

In order to reduce the friction of the sliding parts, it is preferable to employ a wedge of agate or glass.

In the accompanying drawings, Figure 1 is a diagrammatical view of the coupling. Fig. 2 shows a front view of some of the loops or links of a bracelet made according to this invention, said loops or links being in their normal or unstretched position. Fig. 3 is a corresponding view showing the parts in their extended position. Fig. 4 is a side view thereof. Fig. 5 and 6 are respectively front and side views, on a larger scale, of two loops or links coupled together. Fig. 7 is a cross-section on the line 7 7 of Fig. 6. Fig. 8 shows an agate wedge removed from its framing. Figs. 9 and 10 show modified designs of the wedge members.

As I have already stated, my bracelet is formed of a series of loops or links and wedge-like pieces alternating with one another. The wedge-like pieces constituting the aforesaid coupling are formed of diverging double wedges $b\,b$, as shown in Fig. 1. The double wedge $b\,b$ is mounted on or provided with an ornamental plate or framing $c$, and grooves $g$ are formed in its sides for the ends of the loops or links $a$ to slide in. Each loop or link $a$ has its ends nipping or pressing tightly against the sides of the wedge. The links $a$ are coiled in such a manner that their ends $e$, sliding on the surfaces $d$ of the wedges, exercise a spring action upon them.

The bracelet is composed alternately of double wedges and of links in such a manner that two links constitute a common member between two double wedges, as clearly seen from Figs. 2 to 4.

When the bracelet is extended, the ends of the loops or links are drawn toward the extremities of wedges and are thereby forced apart, so as to increase the distance between the members. On releasing the bracelet the resiliency causes the ends of the loops or links to slide toward the apex of the wedges, so contracting the bracelet.

In order to reduce the friction as far as possible, the wedges are preferably formed of agate or glass. A simple agate wedge $n$ I have represented by Fig. 8.

The ends of the grooves $g$ serve at the same time as stops for the ends of the links, so as to limit the movement of the links or bracelet, respectively.

It is to be understood that the essential feature of my invention consists in the use of a double wedge, admitting ornaments of every kind, which could not be employed in the bracelets hitherto employed.

In the modifications represented by Figs. 9 and 10 the plates $m$ are of different design from the plates $c$ shown in the other views.

What I claim, and desire to secure by Letters Patent, is—

1. In a bracelet, the combination of a double wedge member of increasing width toward each extremity and open links having their ends engaging the opposite diverging sides of the wedges and arranged to slide along said sides.

2. In a bracelet, the combination of a double wedge member of increasing width toward each extremity, open links having their ends engaging the opposite diverging sides of the wedges and arranged to slide along said sides, and stops on the wedge member arranged to limit the said movement of the links.

3. In a bracelet, the combination of a double wedge member of increasing width toward each extremity, and open links having their ends engaging the opposite diverging sides of the wedges and arranged to slide along said sides, and means for guiding the said ends of the links.

4. In a bracelet, the combination of a double wedge member of increasing width toward each extremity, said wedges having grooves in said diverging sides, and open links having their ends engaging the walls of said grooves and arranged to slide along said walls.

5. In a bracelet, the combination of a double wedge member, of increasing width toward each extremity, open links having their ends engaging the opposite diverging sides of the wedges and arranged to slide along said sides, and plates attached to the faces of said wedge member.

6. In a bracelet, the combination of a double wedge member of increasing width toward each extremity, and open links having their ends engaging the opposite diverging sides of the wedges and arranged to slide along said sides, said wedge member having a hardened bearing-surface for said links.

7. In a bracelet, the combination of a double wedge member of increasing width toward each extremity, and open links having their ends engaging the opposite diverging sides of the wedges and arranged to slide along said sides, said wedges being composed of agate.

In witness whereof I have hereunto set my hand in presence of two witnesses.

JOSEF OTTMAR ZIEHER.

Witnesses:
KARL BOSCH,
HERMANN WAGNER.